United States Patent
Sangsingkeow

(10) Patent No.: US 6,191,693 B1
(45) Date of Patent: Feb. 20, 2001

(54) ELECTRONIC ANIMAL DETERRENT FOR PROTECTING AN AREA

(75) Inventor: Rungwit Sangsingkeow, Knoxville, TN (US)

(73) Assignee: Radio Systems Corporation, Knoxville, TN (US)

( * ) Notice: Under 35 U.S.C. 154(b), the term of this patent shall be extended for 0 days.

(21) Appl. No.: 09/520,679

(22) Filed: Mar. 7, 2000

(51) Int. Cl.$^7$ .................................................. G08B 23/00
(52) U.S. Cl. ............................. 340/573.3; 340/573.4; 340/552; 119/720; 119/721; 119/859; 119/908
(58) Field of Search .......................... 340/573.3, 573.2, 340/552, 541, 573.4; 119/721, 908, 859, 719, 720

(56) References Cited

U.S. PATENT DOCUMENTS

| | | | |
|---|---|---|---|
| 4,689,776 | 8/1987 | Thorndyke et al. | 367/139 |
| 4,987,402 | 1/1991 | Nykerk | 704/274 |
| 5,214,411 | 5/1993 | Herbruck | 340/573.2 |
| 5,241,923 * | 9/1993 | Janning | 119/721 |
| 5,463,595 | 10/1995 | Roadhall et al. | 367/93 |
| 5,501,179 | 3/1996 | Cory | 119/712 |
| 5,627,518 | 5/1997 | Wishart | 340/567 |
| 5,724,919 | 3/1998 | Boyd et al. | 119/719 |
| 5,852,403 * | 12/1998 | Boardman | 340/573.3 |
| 5,870,972 | 2/1999 | Zinter et al. | 119/719 |
| 5,872,516 * | 2/1999 | Bonge, Jr. | 340/573.3 |
| 5,949,350 * | 9/1999 | Girard et al. | 340/825.49 |
| 6,016,100 | 1/2000 | Boyd et al. | 340/384.2 |
| 6,043,748 * | 3/2000 | Touchton et al. | 340/573.3 |
| 6,064,308 * | 5/2000 | Janning et al. | 340/573.3 |
| 6,075,443 * | 6/2000 | Schepps et al. | 340/573.4 |
| 6,079,367 * | 6/2000 | Stapelfeld et al. | 119/720 |

* cited by examiner

Primary Examiner—Benjamin C. Lee
(74) Attorney, Agent, or Firm—Pitts & Brittian, P.C.

(57) ABSTRACT

An animal deterrent system for protecting a specific area. The animal deterrent system includes an infrared detection system for determining when an animal enters the protected area and an electromagnetic field (EMF) generator for communicating with a stimulus delivery system disposed on a collar worn by the pet. The stimulus delivery system produces a non-lethal electrostatic shock which encourages the pet to leave the protected area.

17 Claims, 5 Drawing Sheets

ELECTRONIC ANIMAL DETERRENT FOR PROTECTING AN AREA

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

This invention relates to the field of systems for deterring an animal from an area. More specifically, the present invention relates to an animal deterrent system which generates an electromagnetic field for activating a stimulus delivery system worn by a pet when an infrared sensor detects movement in the protected area.

2. Description of the Related Art

Property owners must deal with the possibility of intrusion upon their property by animals. While an animal simply traveling across the property may not be a problem, it can create a nuisance when the intruding animal chooses to dig holes, mark its territory, or dig in trash cans, etc. One possible method of preventing animal intrusion is by erecting a fence or other barrier; however, this is often expensive and may not be aesthetically pleasing or practicable. For example, a property owner may wish to keep animals away from an ornamental garden. Raising a fence is impractical as it obscures the garden and ruins the ornamental effect. Furthermore, the property owner may not need the entire property protected. For example, a property owner may simply need to keep animals out of a trash can.

A variety of devices designed to deter an animal from a specific area using an audible deterrent have been developed. However, these devices rely on the deterrent effect of the audible stimulus to keep an animal away from a specific area. Generally, such a deterrent only startles the animal and does not cause any injury. Unfortunately, not all animals are deterred by an audible sound, particularly those that come in contact with the audible deterrent device on a regular basis. This is particularly true with pets.

A pet is often contained in a yard bounded by either a conventional or electronic fence. While a conventional fence generally eliminates the concern of intrusion by stray animals, it may be desirable to deter animals belonging to the property owner from certain portions of the containment area. Within the containment area, the property owner may wish to provide a pet-free area, such as a flower or vegetable garden or near the trash cans. However, the confined pet will likely repeatedly encounter an audible deterrent and, over time, will become familiar with the sound. Accordingly, the audible deterrent loses its effectiveness at startling the pet.

It is also known to incorporate an infrared sensor in conventionally available animal deterrent systems to detect the presence of an animal in the protected area. Typically, these sensors react only to the presence of a "warm body". Sensors merely reacting to heat within the protected area do not take into account whether the animal is inadvertently standing near the edge of the protected area or actively trying to enter the protected area. As the goal is merely to deter the pet from entering the protected area, it is desirable only to apply a stimulus to a pet which is actively encroaching the zone of protection.

Accordingly, there is a need for an animal deterrent system which deters a specific animal from a protected area. Such an animal deterrent system needs a deterrent mechanism to which the animal cannot become accustomed. Further, there is a need for an animal deterrent system which can detect the motion of an animal an initiate a single deterrent pulse periodically until the animal leaves the sensor range. Finally, there is a need for an animal deterrent system which is capable of maintaining a desired orientation when mounted in an isolated outdoor location.

Therefore, it is an object of the present invention to provide an animal deterrent system capable of generating an electromagnetic field for activating a stimulus deterrent device worn by a specific animal.

It is another object of the present invention to generate the electromagnetic field only when the pet systematically moves within the protected area.

Further, presently available animal deterrent systems incorporate an infrared sensor.

Various animal deterrent systems are presently available. The deterrent stimuli used in presently available animal deterrent systems are typically audible, with the primary difference being the frequency range of the deterrent. Animal deterrent systems having deterrents which are audible in the range of human hearing quickly become a nuisance for the property owner and neighbors alike. These deterrents must be loud enough to sufficiently startle and frighten the animal to be effective as a deterrent. Further, the activation of animal deterrent systems during the night is unacceptable in many residential neighborhoods where houses are in close proximity. Accordingly, ultrasonic deterrents which operate at frequencies above the range of human hearing are often used.

Presently available animal deterrent systems incorporate an infrared sensor for detecting the presence of an animal having a body temperature warmer than that of the ambient atmosphere. Typically, these sensors simply react to the presence of such a body. Accordingly, should an animal enter into the range of the sensor, the deterrent will continuously sound while the animal remains within the sensor range. Because a single deterrent pulse has the required deterrent effect, the use of a continuous deterrent places an unnecessary drain on the power supply.

Finally, properly mounting the animal deterrent system in isolated, outdoor locations is crucial for maintaining protection of the desired area. One method for mounting presently available animal deterrent systems in an isolated outdoor location is a stake which can be driven into the ground, for example in a garden. The stake is typically a rounded peg which supports the sensor unit. However, animal deterrent systems incorporating a rounded peg are subject to misalignment caused by environmental factors, such as wind and rain, or incidental contact. Such misalignment often renders the animal deterrent ineffective as it is no longer oriented to "watch" the protected area. Similarly, variations in the flora and the terrain surrounding the area to be protected interfere with the operation of the animal deterrent system requiring the sensor unit to be mounted at various heights to compensate.

Accordingly, there is a need for an animal deterrent system which incorporates an ultrasonic deterrent of varying frequency to deter animals from a specific area. Further, there is a need for an animal deterrent system which can detect the motion of an animal and initiate a single deterrent pulse periodically until the animal leaves the sensor range. Finally, there is a need for an animal deterrent system which is capable of maintaining a desired orientation when mounted in an isolated, outdoor location.

Therefore, it is an object of the present invention to provide an animal deterrent system capable of generating an ultrasonic deterrent stimulus for deterring an animal from a protected area.

It is a further object of the present invention to provide an ultrasonic deterrent which oscillates over a specified frequency range for obtaining the attention of the target animal and increasing the effectiveness of the deterrent among various animals.

A still further object of the present invention is to provide an animal deterrent system which detects an animal within the sensor range and generates a single deterrent stimulus when the detection count exceeds a specified number within a predetermined amount of time, thereby preventing false triggering of the unit.

Yet another object of the present invention is to provide an animal deterrent system which can be securely mounted in an isolated, outdoor location so as to maintain the desired orientation of the sensor unit independent of environmental conditions or incidental contact.

Another object of the present invention is to provide an animal deterrent system which can be mounted at various heights at an isolated, outdoor location to accommodate variations in flora and terrain.

BRIEF SUMMARY OF THE INVENTION

Disclosed is an animal deterrent system for protecting a specific area. The animal deterrent system includes an infrared detection system for determining when an animal enters the protected area and an electromagnetic field (EMF) generator for communicating with a stimulus delivery system disposed on a collar worn by the pet. The stimulus delivery system produces a non-lethal electrostatic shock which encourages the pet to leave the protected area.

An infrared sensor and deterrent signal transmitter, or sensor-transmitter, is located within an area to be protected, such as a garden. The sensor-transmitter includes an infrared sensor array disposed behind an infrared transparent window. The sensor array is configured to detect infrared emissions within a predetermined number of sensor zones by using a number of infrared sensors. Each sensor can be individually set for a specific range. The infrared transparent window has a plurality of facets desired to disrupt continuous infrared emissions into a series of infrared pulses as an infrared source, such as pet, moves across the sensor field. False triggers are screened based upon the number and frequency of the detected infrared pulses. Using the number of counts and the timing information, a control circuit determines whether the pet is moving within the protected area. When it is determined that a pet has entered the protected area, the control circuit activates the EMF generator which produces an electromagnetic field centered on the sensor-transmitter and having a predetermined, adjustable diameter selected to enclose the protected area using a user-adjustable transmitter range control. A pet wearing a deterrent collar responsive to the EMF field is discouraged from entering the protected area by the application of a deterrent stimulus. By using the infrared sensor array to monitor the protected area and only activating the EMF generator when necessary, power savings are achieved to prolong battery life.

The deterrent collar worn by the pet includes a receiver responsive to the electromagnetic field. Upon receipt of the electromagnetic field, a deterrent signal generator produces a stimulus signal having a predetermined, adjustable intensity selected by an adjustable intensity control. A stimulus delivery device in electrical communication with the deterrent signal generator delivers stimulus signal to the pet.

DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An animal deterrent system for protecting a specific area is illustrated generally at 10 in the figures. The animal deterrent system includes an infrared detection system for determining when an animal enters the protected area and an electromagnetic field (EMF) generator for communicating with a stimulus delivery system disposed on a collar worn by the pet. The stimulus delivery system produces a non-lethal electrostatic shock which encourages the pet to leave the protected area.

Figure 1:
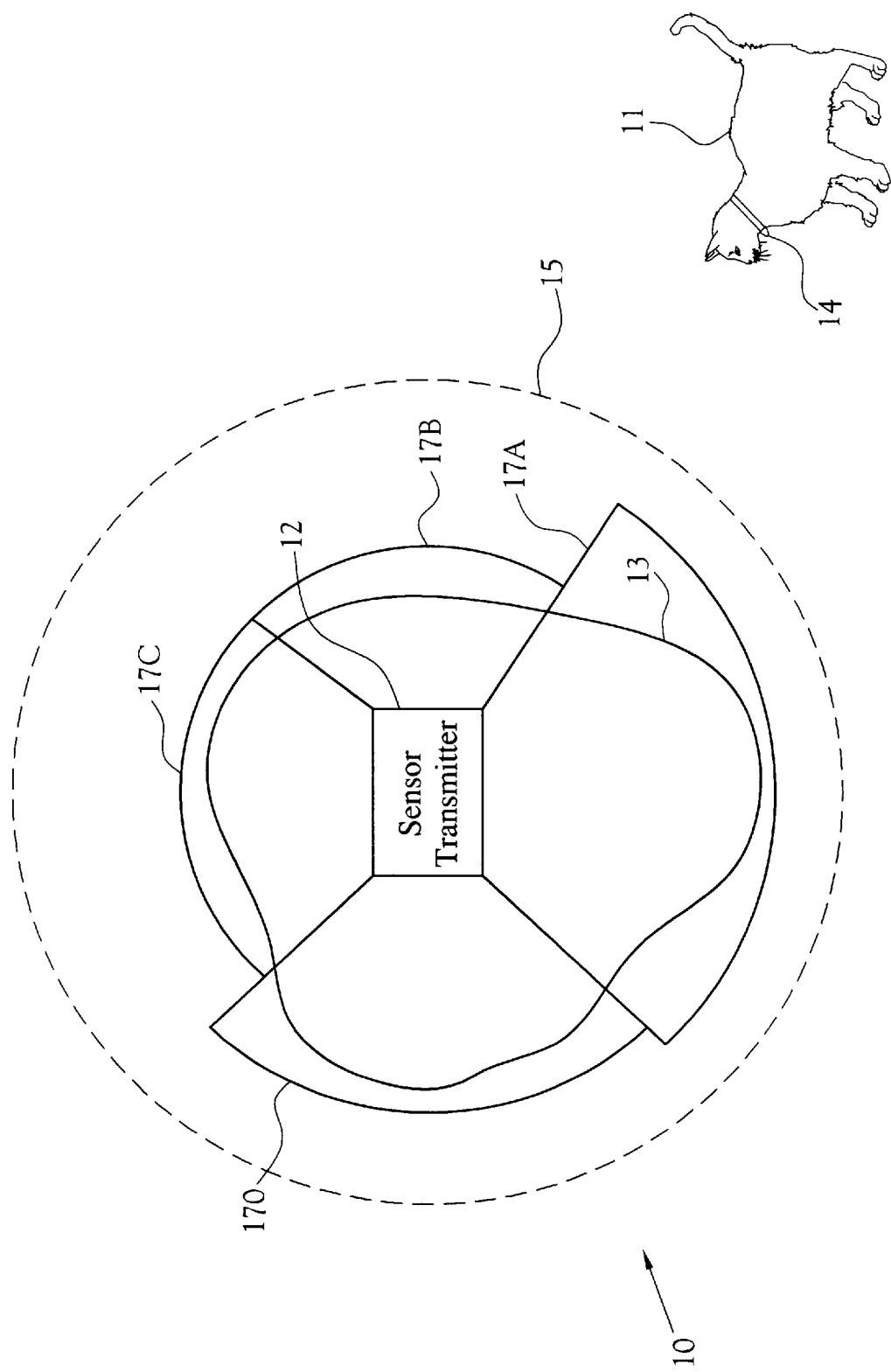
FIG. 1 is a diagram of an animal deterrent system according to the present invention showing the zones of protection.

FIG. 1 is an illustration of the animal deterrent system 10. Generally, an infrared sensor and deterrent signal transmitter, or sensor-transmitter, 12 is located within an area 13 to be protected, such as a garden. The sensor-transmitter detects infrared emissions within a predetermined number of sensor zones 17. Each sensor zone can be individually set for a specific range. In the illustrated embodiment, four sensor zones are illustrated having various range settings; however, one skilled in the art will recognize that any number of sensor zones can be used to provide the desired protection. The sensor-transmitter 12 produces an EMF field 15 centered around the sensor-transmitter 12. A pet 11 wearing a deterrent collar 14 responsive to the EMF field 15 is discouraged from entering the protected area 13 by the application of a deterrent stimulus.

Figure 2:
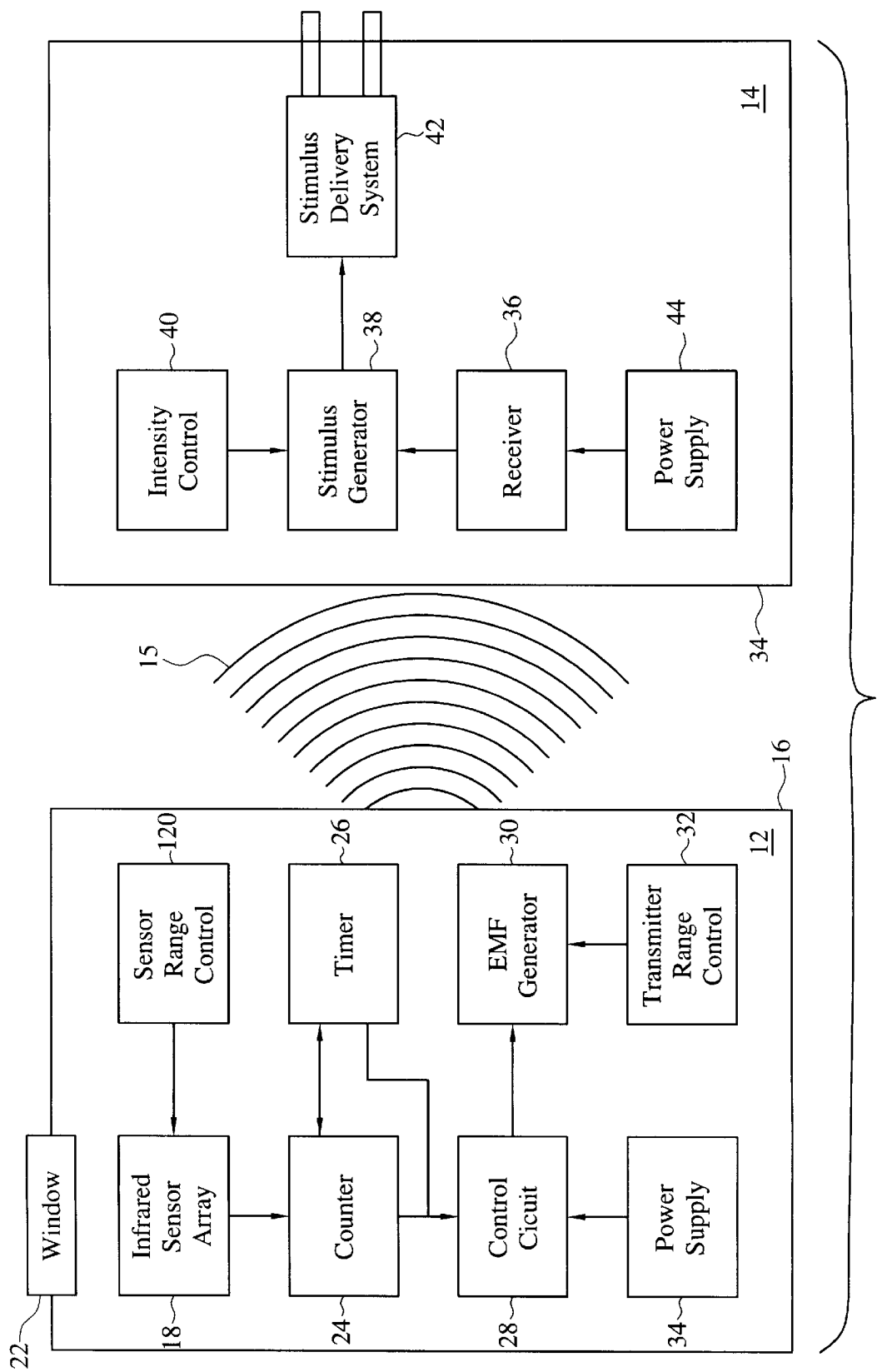
FIG. 2 is a block diagram of the animal deterrent system of FIG. 1.

FIG. 2 illustrates a block diagram of the animal deterrent system 10. The transmitter 12 is enclosed within a weatherproof housing 16. Disposed within the weatherproof housing 16 is at least one infrared sensor forming an infrared sensor array 18. One skilled in the art will recognize that the number of infrared sensors forming the array 18 depends upon the desired arc of protection. Each infrared sensor is provided with an individually adjustable range selector 20. Further, each infrared sensor is disposed behind an infrared transparent window 22 in the weatherproof housing 16. The window 22 includes a plurality of facets (not shown) desired to disrupt continuous infrared emissions into a series of infrared pulses as an infrared source, such as pet 11, moves across the sensor field. A counter 24 in electrical communication with the infrared sensor array 18 counts each detected pulse. A timer 26 in electrical communication with the counter 24 measures the period between each counted pulse. Using the number of counts and the timing information, a control circuit 28 determines whether the detected infrared pulses indicate that the pet 11 is moving within the protected area 13. The control circuit 28 is in electrical communication with an EMF generator 30. When it is determined that a pet 11 has entered the protected area 13, the control circuit 26 activates the EMF generator 30 which produces the electromagnetic field 15 having a predetermined, adjustable diameter selected to enclose the protected area 13 using a user-adjustable transmitter range control 32. The sensor-transmitter 12 is powered by power supply 34. In the illustrated embodiment, the sensor-transmitter power supply 34 is a battery allowing the sensor-transmitter to be placed in a location remote from a readily accessible external power source. By using the infrared sensor array 18, which consumes a relatively low amount of power, to monitor the protected area 13 and only activating the EMF generator 30, which consumes a greater amount of power, when necessary, battery life is prolonged.

The deterrent collar 14 worn by the pet includes a weatherproof housing 34 enclosing the deterrent electronics. Disposed within the collar weatherproof housing 34 is a receiver 36 responsive to the electromagnetic field 15. The receiver 36 produces a reception signal. A deterrent signal generator 38 responsive to the reception signal produces a stimulus signal having a predetermined, adjustable intensity selected by an adjustable intensity control 40. A stimulus delivery device 42 in electrical communication with the deterrent signal generator 38 delivers stimulus signal to the pet 11. One skilled in the art will recognize that a variety of stimulus delivery devices could be selected depending upon the desired deterrent. The available deterrents include, but are not limited to, electrostatic shock, sound, and the spraying of unpleasant substances. The deterrent collar 14 is powered by power supply 44. In the illustrated embodiment, the deterrent collar power supply 44 is a battery.

Figure 3:
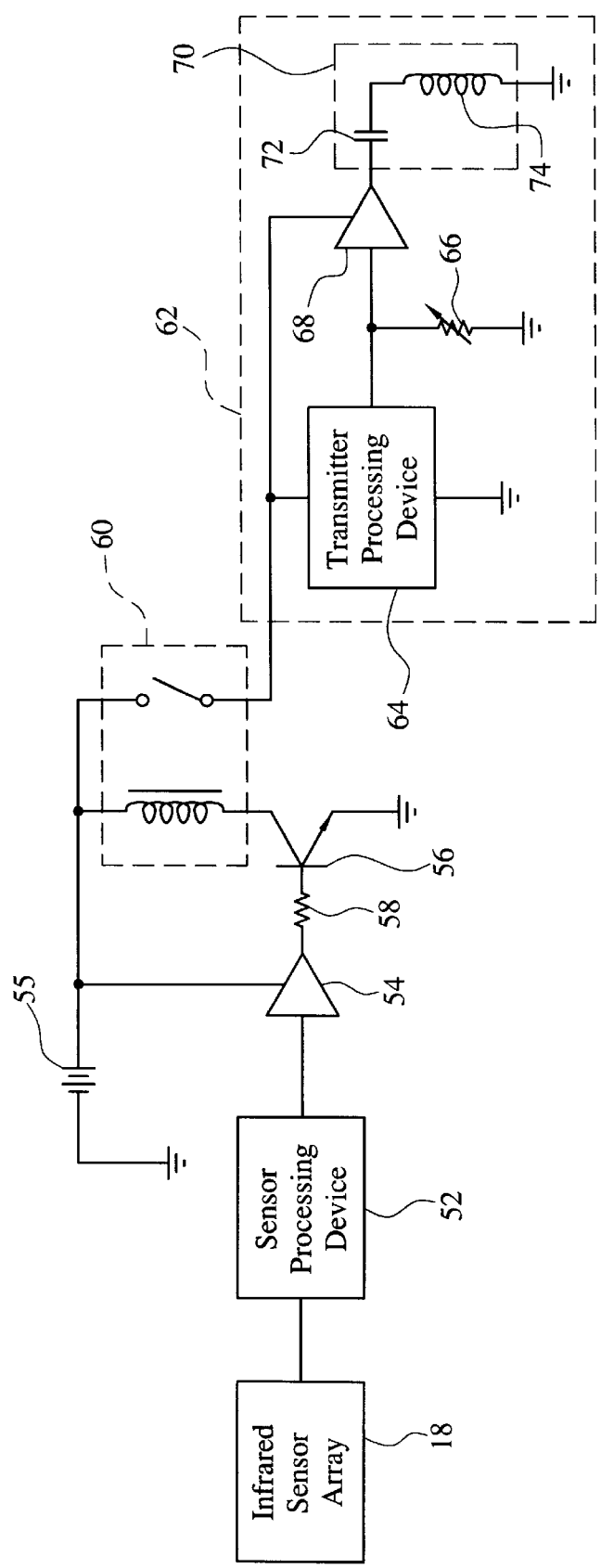
FIG. 3 is a schematic diagram of one embodiment of a sensor-transmitter according to the present invention.

FIG. 3 illustrates a schematic diagram of one embodiment of the sensor-transmitter circuit 50 of the present invention. As the infrared sensor array 18 picks up movement of a nearby pet 11, a detection signal is generated. A processing device 52 screens the detection signals to avoid false triggering and generates an activation signal upon the occurrence of a predetermined condition, such as when the number and frequency of the detection signals indicates the presence of the pet 11. The activation signal is amplified by an amplifier circuit 54. In the illustrated embodiment, the amplifier circuit 54 is electrically connected to a buffer circuit 56 via resistor 58. In response to the activation signal, the buffer circuit 56 closes a relay 60 thereby connecting a power supply 55 to the electromagnetic field (EMF) generator 62. The EMF generator includes a processing device 64, a range control device 66, an amplifier 68, and resonant circuit 70 including a capacitor 72 and inductor 74. One skilled in the art will recognize that the processing device 64 can be an ASIC. The processing device generates a modulated signal having a frequency of either 7.37 or 10.65 kHz. The modulated signal is amplified by amplifier 68 and broadcast through the resonant circuit 70. Specifically, the inductor 74 generates a circular modulated electromagnetic field 15 having a predetermined radius selected by the user via range control device 66. When the pet 11 wearing the deterrent collar 14 collar approaches the electromagnetic field 15, it receives a deterrent. In one embodiment, the deterrent includes a warning sound and a mild electrostatic shock. The generation of the electromagnetic field 15 is terminated after either a predetermined period of time or the end of the triggering condition, i.e., the pet 11 leaves the protected area 13.

Figure 4:
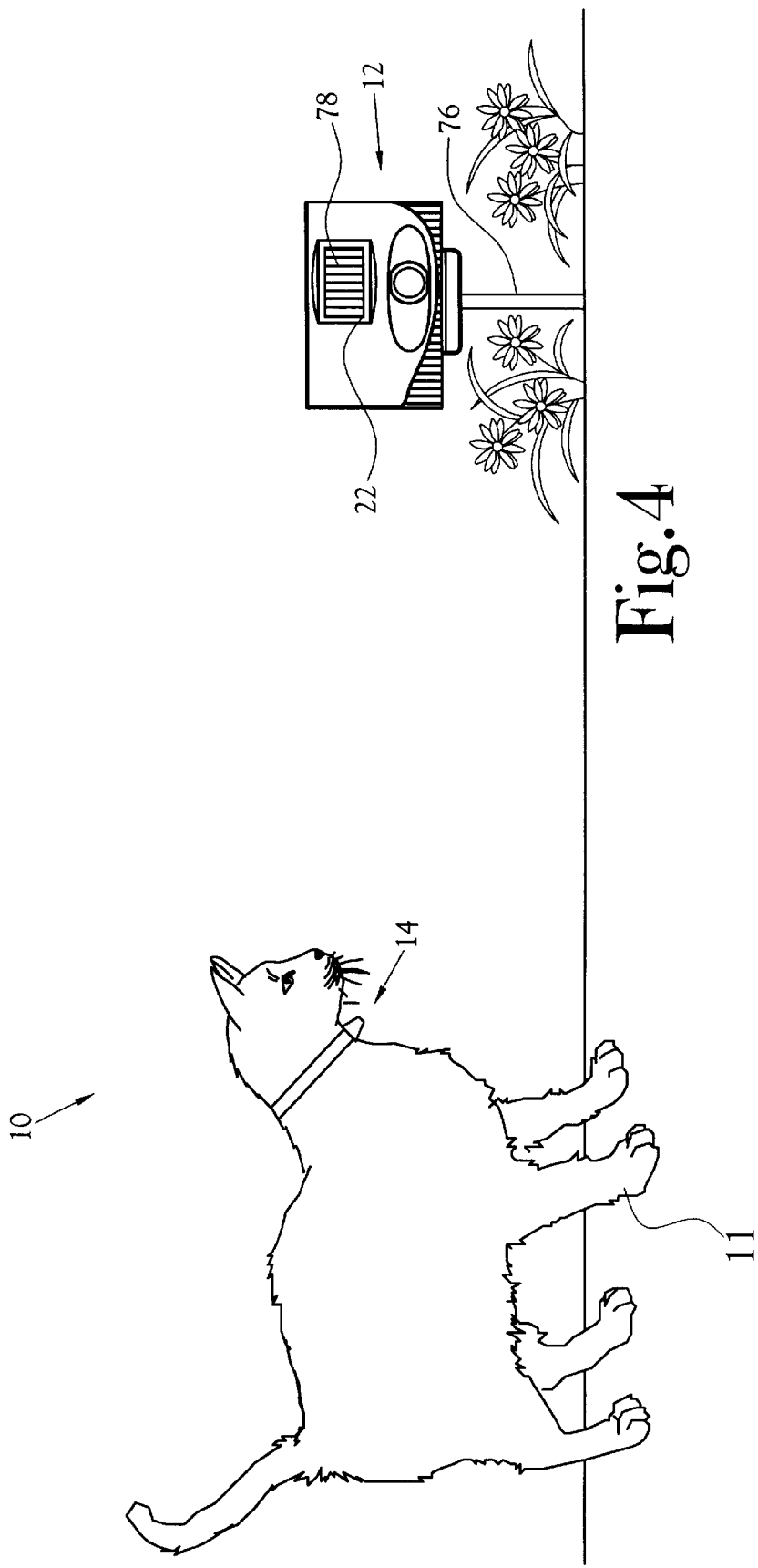
FIG. 4 is a front elevation view of an embodiment of the animal deterrent system showing the facets of the infrared transparent window.

FIG. 4 shows the animal deterrent system 10 in use. In the illustrated embodiment, the weatherproof sensor-transmitter housing 16 resting upon an elongated support member 76 which is secured into the ground. Visible is the infrared transparent window 22 showing the facets 72 which break up the infrared emissions from the pet 11. The pet 11 is shown wearing the deterrent collar 14.

Figure 5:
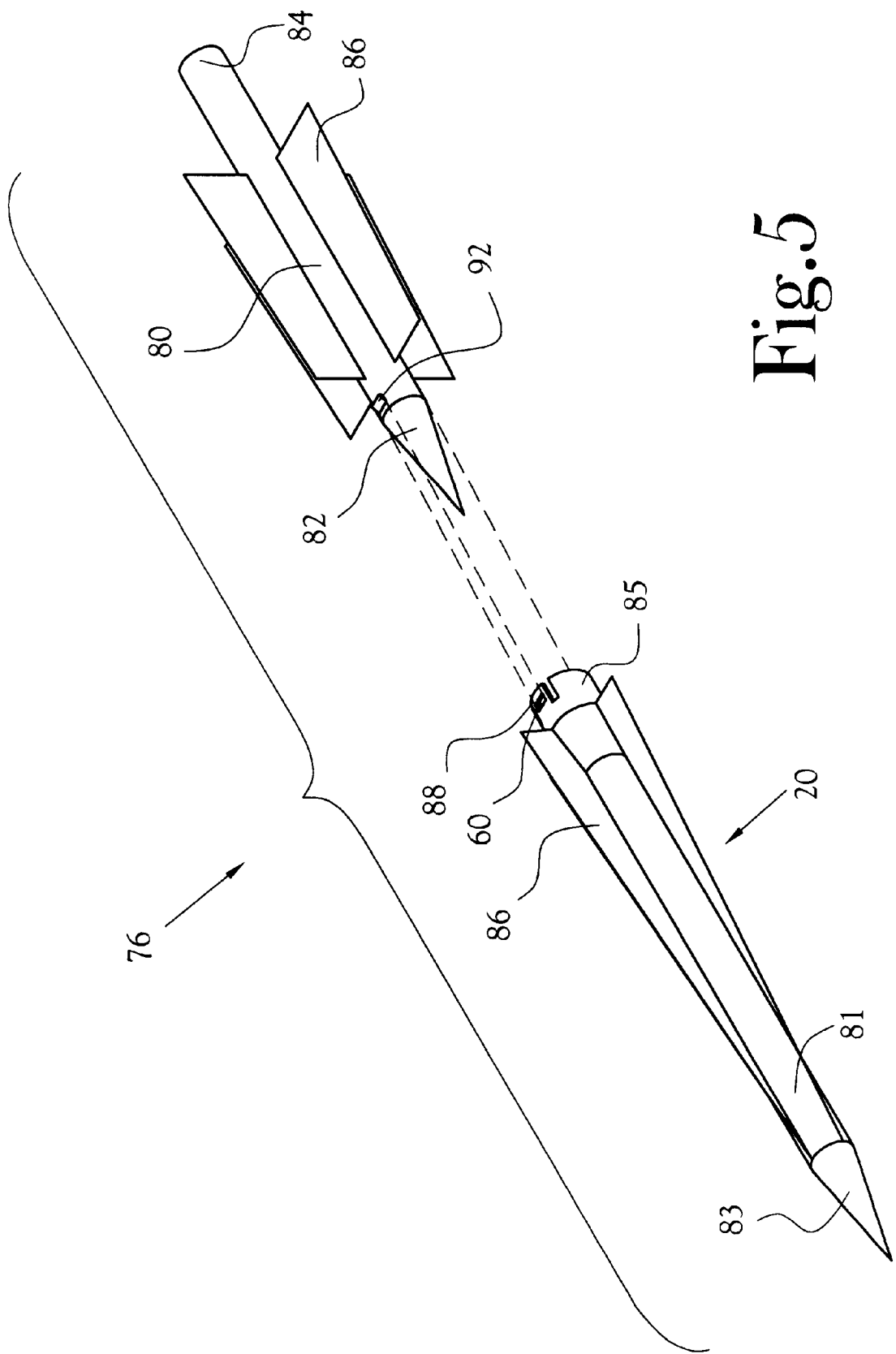
FIG. 5 is a perspective view of the support member of the animal deterrent system of the present invention.

Referring now to FIG. 5, one embodiment of the elongated support member 76 is shown in detail. The elongated support member 76 includes a base member 80 and an extension member 81. The base member 80 has a first end 82 adapted to be secured in the ground and a second end 84 adapted to connect to the sensor-transmitter housing 16. One skilled in the art will recognize that a number of configurations can be used to connect the base member 80 to the sensor-transmitter housing 16 without interfering with the objects or function of the present invention. The extension member 81 allows variations in the mounting height of the sensor-transmitter 12. Accordingly, the extension member 81 has a first end 83 adapted to be secured in the ground and a second end 85 adapted to The extension member second end 85 is adapted to receive the base member first end 82 thereby lengthening the elongated support member 76. In the illustrated embodiment, the extension member 81 defines at least one linking tab 88 defining a slot 90 for receiving a tab 92 defined by the base member 80. One skilled in the art will recognize that other linking assemblies can be used to interlock multiple elongated members. Further, one skilled in the art will recognize that the number and length of the elongated members can vary without interfering with the objects or function of the present invention.

In the illustrated embodiment, the base member 80 and the extension member 81 generally have a circular cross-section with each first end 82, 83 having a conical shape. One skilled in the art will recognize that other shapes could be used for the base member 80 and the extension member 81 without interfering the function or purpose of the animal deterrent system 10.

Because the cross section of the base member 80 and the extension member 81 are generally circular, incidental contact such as from an animal or strong wind can cause the sensor-transmitter 12 to become misaligned due to rotation. Accordingly, each of the base member 80 and the extension member 81 includes an anti-rotation mechanism 86 to prevent rotation. In the illustrated embodiment, the anti-rotation mechanism 86 includes four vanes extending radially from the exterior surface of the base member 80. One skilled in the art will recognize that other numbers of and positions for the vane or vanes can be used to achieve the intended purpose.

The animal deterrent system serves to deter a pet wearing a deterrent collar from remaining within a protected area. The continuous infrared signal given off by the pet is disrupted into discrete infrared signals as the pet moves by a faceted infrared transparent window. The discrete infrared signals are detected and counted for a predetermined period of time. If the number of discrete infrared signals counted exceeds a predetermined minimum, an electromagnetic field having a predetermined range is generated. A deterrent delivery system in the collar worn by the pet is responsive to the electromagnetic field and generates a deterrent stimulus which is delivered to the pet while the pet remains within the electromagnetic field.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A system for deterring a animal from a specific area, said system comprising:
   at least one detector for detecting an external signal representing an animal;
   a detection signal generator responsive to said detector for generating a detection signal;
   a power supply in electrical communication with said system;
   an electromagnetic field generator connectable to said power supply, said electromagnetic field generator generating an electromagnetic field having a predetermined range;
   a control circuit in electrical communication with said detection signal generator, said control circuit connecting said electromagnetic field generator to said power supply during a predetermined condition; and
   a deterrent delivery system being carried by the animal, said deterrent delivery system applying a deterrent stimulus to the animal in response to said electromagnetic field.

2. The system of claim 1 wherein said electromagnetic field generator generates an electromagnetic field having an adjustable range.

3. The system of claim 1 wherein said predetermined condition includes a predetermined number of detection signals occuring within a predetermined period of time.

4. The system of claim 1 wherein said external signal is continuous, each said at least one detector being disposed behind an detector cover, said detector cover being transparent to said external signal, said detector cover having facets configured to interrupt a continuous external signal into a plurality of discrete signals.

5. The system of claim 1 wherein said control circuit disconnects said electromagnetic field generator from said power supply after a predetermined time period.

6. The system of claim 1 wherein said control circuit disconnects said electromagnetic field generator from said power supply when said predetermined condition no longer exists.

7. A system for deterring a animal from a specific area, said system comprising:
   at least one infrared sensor generating at least one detection signal when an infrared heat source is detected;
   a control circuit in electrical communication with said at least one infrared sensor, said control circuit generating a field generation signal after receipt of said at least one detection signal;
   a power supply in electrical communication with said system;
   an electromagnetic field generator connectable to said power supply for generating an electromagnetic field;
   a switch responsive to said control circuit, said switch electrically connecting said electromagnetic field generator to said power supply in response to said field generation signal; and
   a deterrent delivery system responsive to said electromagnetic field, said deterrent delivery system carried by the animal, said deterrent delivery system applying a deterrent stimulus to the animal.

8. The system of claim 7 wherein each said at least one infrared sensor is disposed behind an infrared transparent window, said infrared transparent window having facets configured to interrupt a continuous infrared signal into a plurality of discrete infrared signals.

9. The system of claim 7 wherein said control circuit generates said field generation signal only after receipt of a predetermined number of detection signals within a predetermined time interval.

10. The system of claim 7 wherein said control circuit closes said switch thereby disconnecting said electromagnetic field generator from said power supply after a predetermined time period.

11. The system of claim 7 wherein said control circuit closes said switch thereby disconnecting said electromagnetic field generator from said power supply when said predetermined condition no longer exists.

12. A method for deterring an animal from remaining within a protected area, said method including the steps of:
   (a) dividing an external signal representing an animal into a plurality of divided signals;
   (b) detecting each of said plurality of divided signals;
   (c) counting said plurality of divided signals occurring within a predetermined period of time;
   (d) generating an electromagnetic field generation signal after a predetermined condition exists;
   (e) generating an electromagnetic field while said electromagnetic field generation signal is generated; and
   (f) delivering a deterrent stimulus to the animal while the animal is within said electromagnetic field, thereby deterring the animal from remaining within the protected area.

13. The method of claim 12 wherein said step of generating deterrent initialization signal after a predetermined condition occurs includes the step of monitoring when a predetermined number of said divided signals have been counted within said predetermined period of time.

14. The method of claim 12 wherein said step of generating an electromagnetic field generation signal after a predetermined condition occurs includes the step of monitoring when a predetermined number of said divided signals have been counted within said predetermined period of time.

15. The method of claim 12 further comprising the step of discontinuing said electromagnetic field generation signal when said predetermined condition no longer exists.

16. The method of claim 12 further comprising the step of discontinuing said electromagnetic field generation signal at a predetermined time period.

17. The method of claim 12 wherein said step of detecting each of said plurality of divided signals includes detecting an object having a greater than ambient temperature.

* * * * *